Jan. 4, 1938.   F. F. M. ABBOTT   2,104,631
CINEMATOGRAPH CAMERA AND PROJECTOR APPARATUS
Filed March 29, 1937   5 Sheets-Sheet 1

INVENTOR,
F. F. M. Abbott,
Frank S. Appleman,
ATTORNEY.

Jan. 4, 1938.   F. F. M. ABBOTT   2,104,631
CINEMATOGRAPH CAMERA AND PROJECTOR APPARATUS
Filed March 29, 1937.   5 Sheets-Sheet 5
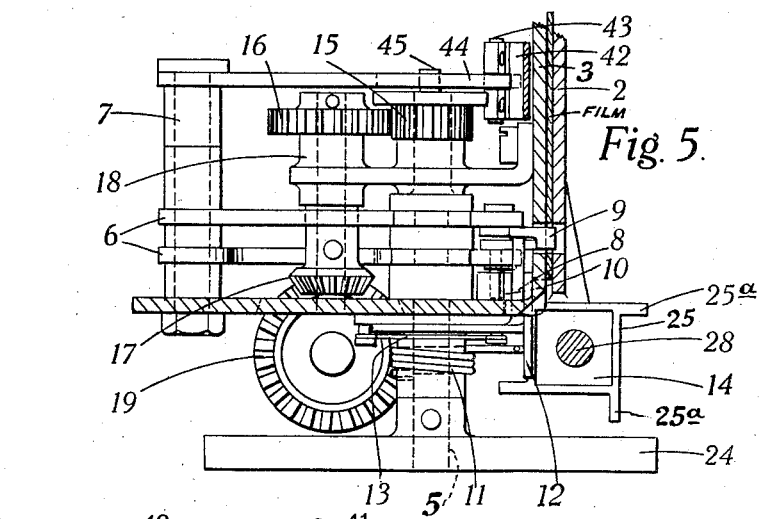
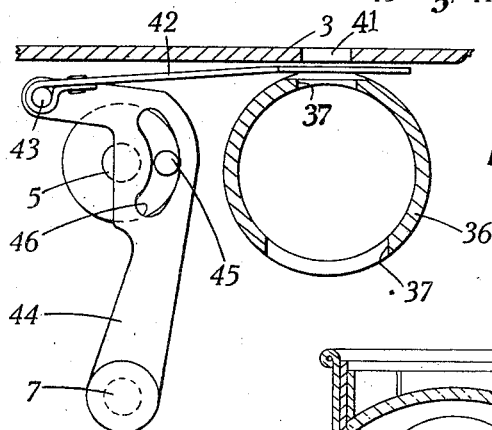
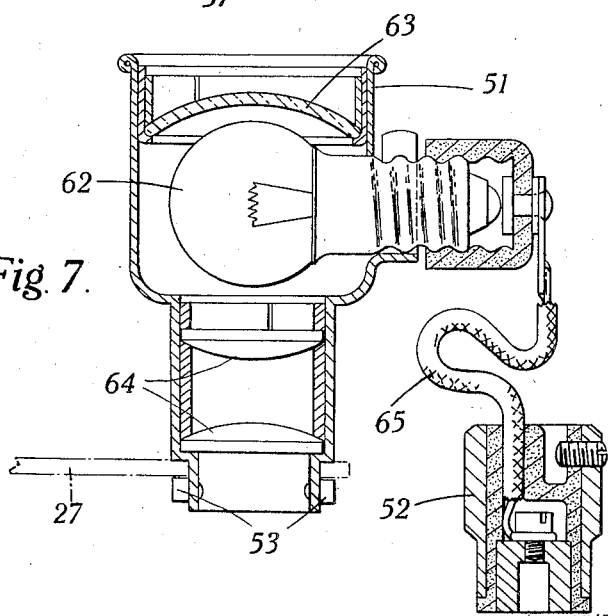
INVENTOR,
F. F. M. Abbott,
BY Frank S. Appleman,
ATTORNEY.

Patented Jan. 4, 1938

2,104,631

UNITED STATES PATENT OFFICE

2,104,631

CINEMATOGRAPH CAMERA AND PROJECTOR APPARATUS

Frederick Fant Michael Abbott, Edgware, England, assignor to Noel Pemberton Billing, London, England Application March 29, 1937, Serial No. 133,738
In Great Britain June 25, 1935

12 Claims. (Cl. 88—16)

This invention relates to taking or projecting cinematographic pictures either in black and white or in colour.

It is usual on a normal cinematographic film to include only a single picture in a space of ¾"×1" on what is known as a 35 mm. film.

It is the object of the present invention to provide a taking or projecting apparatus whereby at least four or a multiple of four pictures may be formed on each area of normal size. By reason of such an arrangement it is possible to reduce the length of film which is required for taking photographs of a moving or other object, whilst the invention also enables the standard 35 mm. film to be used in pocket cameras instead of films of reduced size which are generally more expensive in proportion to their area. As a normal 35 mm. film can be used, these disadvantages are obviated. It will however, be understood that the invention is also applicable to films of smaller size than 35 mm.

According to the present invention an apparatus for taking and/or projecting cinematographic pictures is provided with an optical system for taking and/or projecting which is actuated by the movement of the film so that after the film has moved completely or substantially completely through the film gate, the optical system is moved through a predetermined distance transversely to the direction of movement of the film, whilst the direction of movement of the film is reversed. The optical system may be moved step by step transversely to the direction of movement of the film, the movement of the film being reversed after the optical system has been moved through one step, this operation taking place until the film has been completely exposed. The film may co-operate for this purpose with two members carried on a shaft, one of these members permitting a partial rotation of the shaft after the film has completed or substantially completed its movement in one direction, whilst the other member permitting partial rotation of the shaft in the same direction when the film has completed its movement in the opposite direction. This shaft serves to move the optical system transversely to the movement of the film in steps between predetermined limits.

The invention will now be described with reference to the accompanying drawings, wherein Fig. 1 is a plan of the apparatus, partly in section, and with the cover removed.

Fig. 5 shows a partial cross-section on the line 5—5 of Fig. 2.

Fig. 6 shows a sectional view of the shutter operating mechanism, and

Fig. 7 shows a sectional elevation of the lamp housing and its connecting plug.

Figure 1:
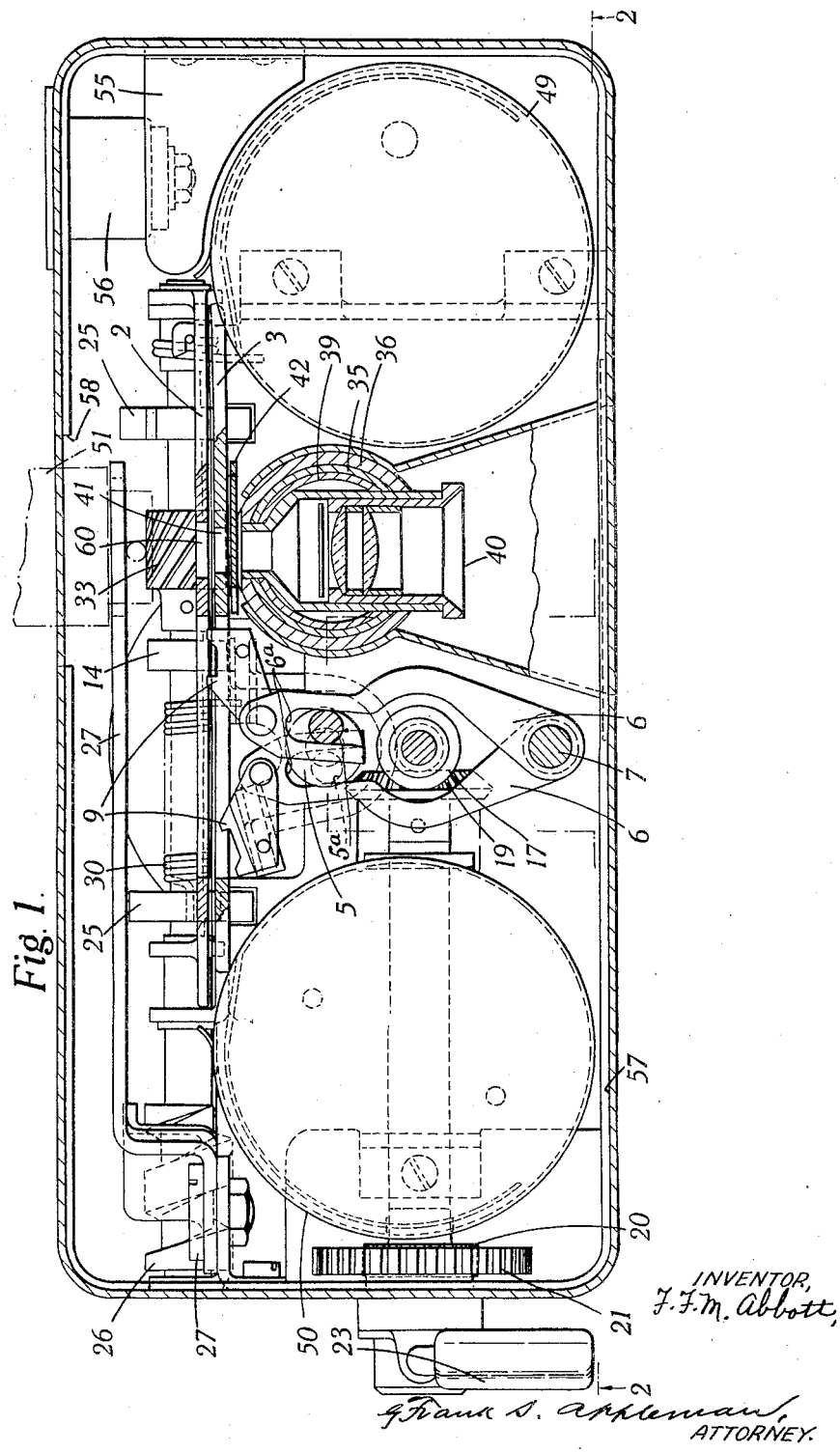

In a frame 1 which is secured in a casing 57 there is mounted a shaft 28 on which there are keyed a cam 14, two members 25, hereinafter referred to as film reversal controls, and a skew gear 33. The purpose of these members will be described hereinafter. Around the shaft 28 is coiled a spring 30 of which one end is secured to the shaft whilst the other end is secured to the casing, this spring acting as a return spring.

On a bearing 29 carried by the frame 1, and in which the shaft 28 is mounted, is coiled a spring 31 which normally tends to move a film gate 2 into the open position. The gate 2 co-operates with a plate 3 and a film adapted to be exposed or projected is passed between the two members 2 and 3. The members 2 and 3 are held in the closed operative position by means of a catch 59.

With the skew gear 33 there is adapted to co-operate a skew gear 34 which is mounted at one end of a tubular member 35 provided at its other end with a head 47 which is preferably milled for the purpose of facilitating its rotation. The tubular member 35 is provided with oppositely disposed complementary helical slots 38 and is fitted into a tubular guide 36 which is provided with oppositely disposed longitudinal slots 37. Inside the tubular member 35 is fitted a tube 39 which carries an optical system 40 which extends through the longitudinal slots 37 and the helical slots 38. A row of apertures 41 is formed in the member 3, each aperture corresponding to a position to be occupied by the lens system 40 for exposure or projection. Opposite the apertures 41 the gate 2 is provided with a single aperture 60.

To one end of the shaft 28 is keyed a boss 26 provided with a helical groove with which engages a pin 32 provided at one end of a bell-crank lever 27 which is pivoted to the frame 1 at 27a. The other end of the bell-crank lever is provided with an opening 61 into which is adapted to be fitted the lamp unit 51 shown in Fig. 7 when the apparatus is to be used for projecting purposes. For the purpose of securing the lamp unit 51 in the opening 61 the latter is provided with diametrically opposite notches 54 with which are adapted to permit the passage of pins 53 on the lamp unit, the parts 53 and 54 constituting a usual bayonet joint. The lamp unit consists of a casing in which is mounted a single pole lamp 62 with which are associated a reflector 63 and a lens system 64. The terminal of the lamp is connected by a lead 65 to a plug 52 adapted to be fitted into one of a pair of sockets 56 of which the other socket is adapted to be connected to one terminal of a source of current of which the other terminal is grounded.

Figure 4:
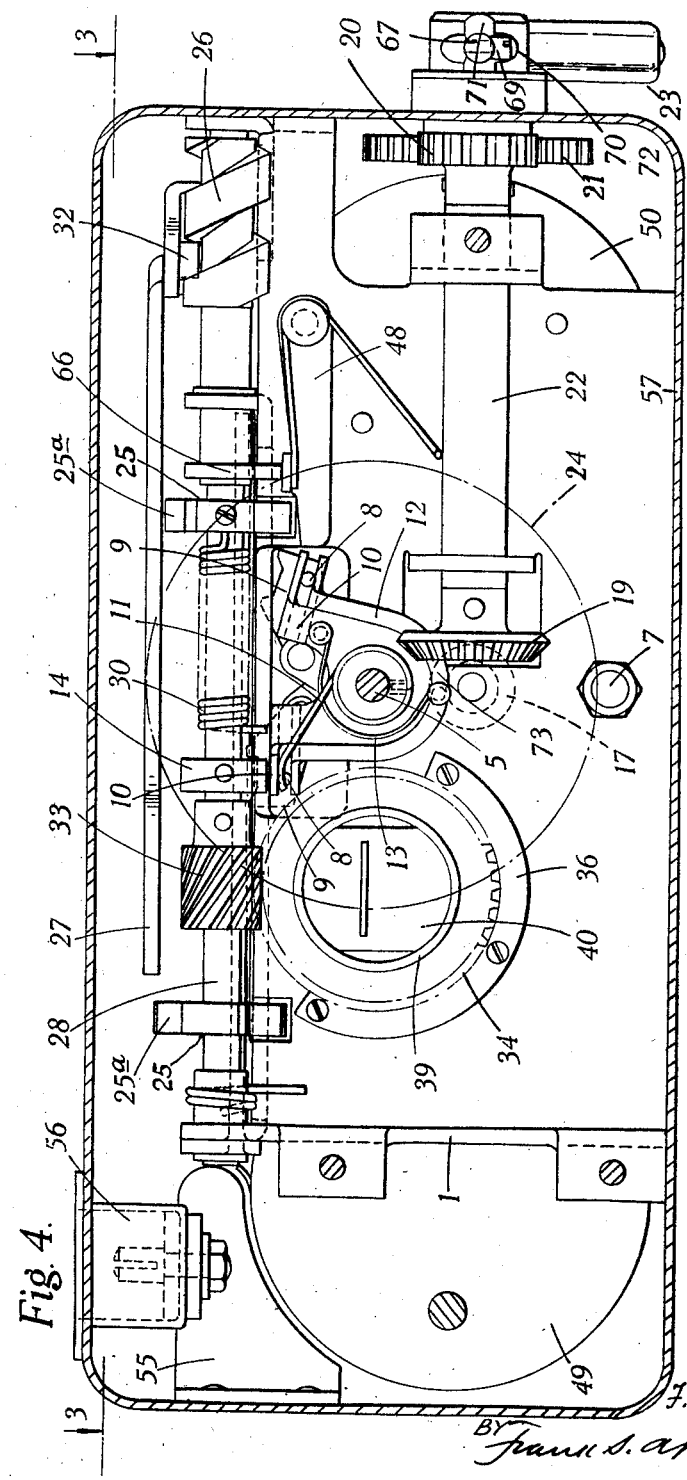
Fig. 4 is a section on the line 4—4 of Fig. 3.

The gate 2 is hingedly mounted on the shaft 28 and one of the hinges 66 is provided with a notch or flattened portion (Fig. 4) which when the gate is in the open position allows a spring catch 48 to engage with one of the members 25 so as to prevent the shaft 28 from turning. When a film has been inserted in the gate and the gate 2 is closed the spring catch 48 is disengaged from the member 25 thus setting the shaft 28 free for being turned.

Transversely to the shaft 28 there is mounted in the frame 1 a crank shaft 5 of which cranks 5ª relatively displaced by 180° engage with slots 6ª provided in levers 6 mounted on a shaft 7 extending parallel to the shaft 5. To the free ends of the levers 6 are pivoted film feeding pawls or claws 9, each of which is preferably provided with two teeth. The crank shaft 5 carries a toothed wheel 15 which engages with a toothed wheel 16 the shaft of which passes through a bearing 18 and carries a bevel wheel 17 gearing with a bevel wheel 19. The bevel wheel 19 is carried on a shaft extending parallel to the shaft 28 and passing through a bearing 22. The shaft of the bevel wheel 19 also carries a toothed wheel 20 which engages with a toothed wheel 21 driven by a handle 23. This handle is preferably so arranged that it can be placed close to the casing 57 when not required for use.

The handle is preferably formed of a spring actuated rod 67 which passes through a boss 68 secured to the spindle of the toothed wheel 21. The rod 67 is provided with a cross pin 69 adapted to engage with a recess 70 in the boss 68 in the disengaged position of the handle and with a recess 71 in the boss 68 in the operative position. The pin 69 is urged into engagement with the recesses by a spring 71'. The operating portion of the handle is formed by a pivoted plate 72.

The film feeding pawls or claws 9 are provided with pins 8 which engage with guide grooves 10 provided in a member 12 freely mounted on the crank shaft 5. The member 12 is normally urged into the position shown in Fig. 4 by a spring 11. One end of the member 12 co-operates with the member 14 in the manner to be described hereinafter.

On the spindle 7 (Fig. 6) there is also mounted a lever 44 provided with an arcuate slot 46 with which engages a crank pin 45 carried at the end of the crank shaft 5. To the free end of the lever 44 there is pivoted at 43 a sliding shutter 42 which moves between the tubular guide 36 and the film gate 2.

In order to balance the movement of the crank shaft 5 during its rotation a flywheel 24 is mounted thereon.

The casing 57 is provided with an opening 58, normally closed by the cover of the apparatus but exposed when the lamp unit 51 is to be fitted to the lever 27 for projection purposes.

At opposite ends of the casing are provided compartments 49 and 50 for the reception of a film, whilst a guide member 55 is provided for guiding the film into the compartment 49.

When a film is to be exposed in the apparatus for taking a cinematographic picture the back of the casing is closed and the lamp unit 51 is not used. When, however, a film is to be projected the back of the apparatus is opened and the lamp unit 51 is fitted on to the lever 27. Otherwise the operation for taking or projecting is the same and will now be described in detail.

The film gate 2 is opened and the knob 47 is rotated whereby the shaft 28 is rotated through the skew gears 34 and 33. The helical groove in the tubular member 35 and the helical groove in the boss 26 are of such a pitch that as a result of the rotation of the member 47 the lens mount 40 is moved in synchronism with the movement of the opening 61 in the member 27 and both parts are moved into the initial position and are held in this position by the engagement of the spring catch 48 with the step or flat on the member 66. A film is now fitted into the magazine 49, the end of the film being placed between the gate 2 and the plate 3, the end of the film being at least beyond the pawls 9 so that one or other of these pawls will engage with the film. For this purpose a mark may be made on the casing to indicate the position to which the end of the film is to extend.

After the film has thus been fitted into position the film gate 2 is closed and secured by the catch 59. The catch 48 is disengaged from the member 25 by the closing of gate 2 and the consequent disengaging of the flat part of 66 from said catch 48 but the shaft 28 is prevented from being moved by the spring 30 by the engagement with the film of one of the members 25. The handle 23 is now rotated in a clockwise direction at a suitable speed and through the medium of the gear train 21, 20, 19, 17, 16, 15 the crank shaft 5 is rotated and in the position shown the left hand pawl 9 in Fig. 1 serves to move the film towards the left. As will be readily seen the mounting of the levers 6 and the engagement thereof by the rotating crank shaft 5 produces an intermittent rocking movement of the pawls 9 whereby, whichever one is in engagement with the film, produces an intermittent feed of the latter. During the continued rotation of the handle 23 the film is moved to the left from the magazine 49 into the magazine 50. Immediately the film has cleared the right hand film reversal control 25 the shaft 28 is partly rotated by the spring 30. The film reversal controls 25 as shown in Fig. 5 are in the form of rectangular members with projecting lugs 25ª. The lugs 25ª of one of the members 25 are relatively displaced by 45° on the shaft 28 with respect to the lugs 25ª of the other member 25 so that as the lug on one of the members 25 is free to move past the film, one of the lugs on the other member comes into contact with the film and thus prevents further rotation of the shaft 28.

Figure 2:
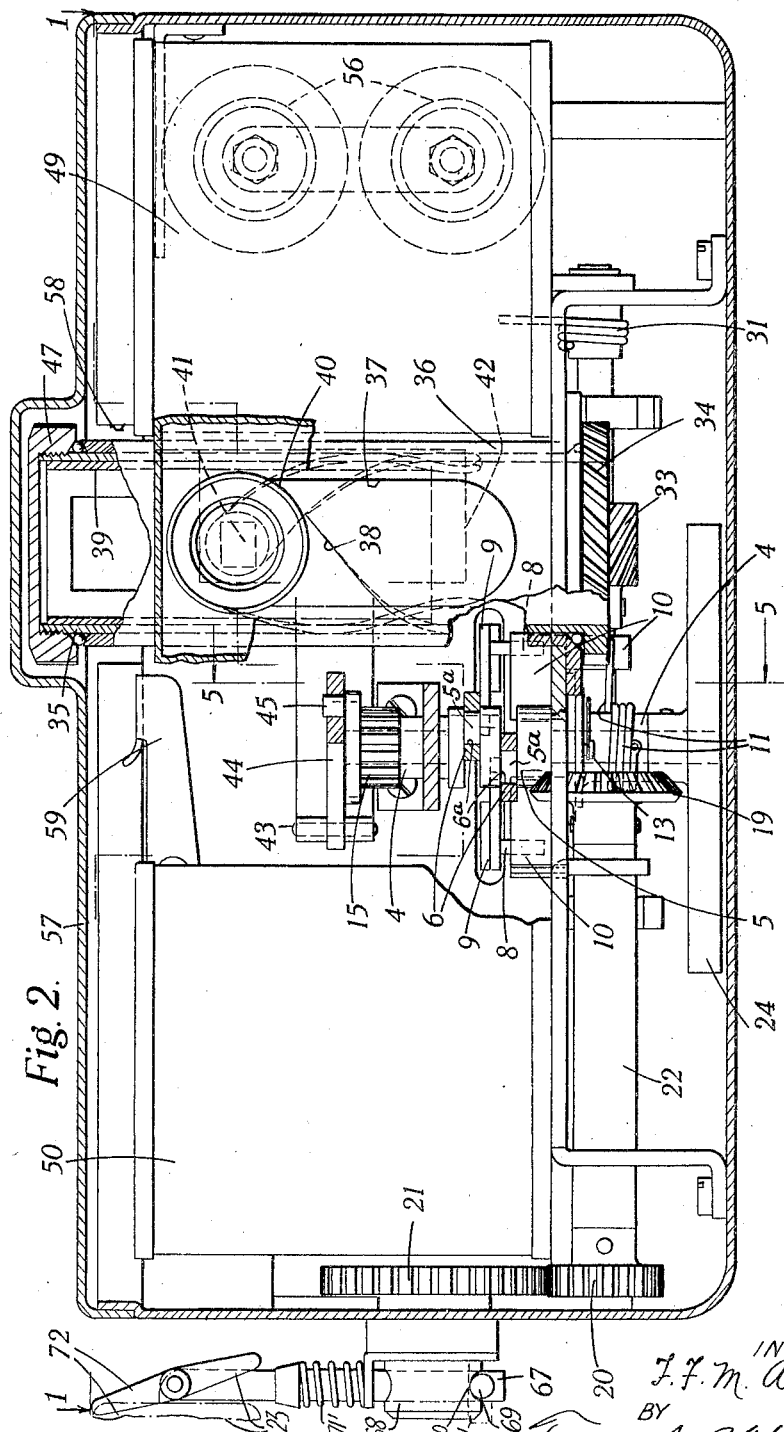
Fig. 2 is a sectional elevation on the line 2—2 of Fig. 1.
Figure 3:
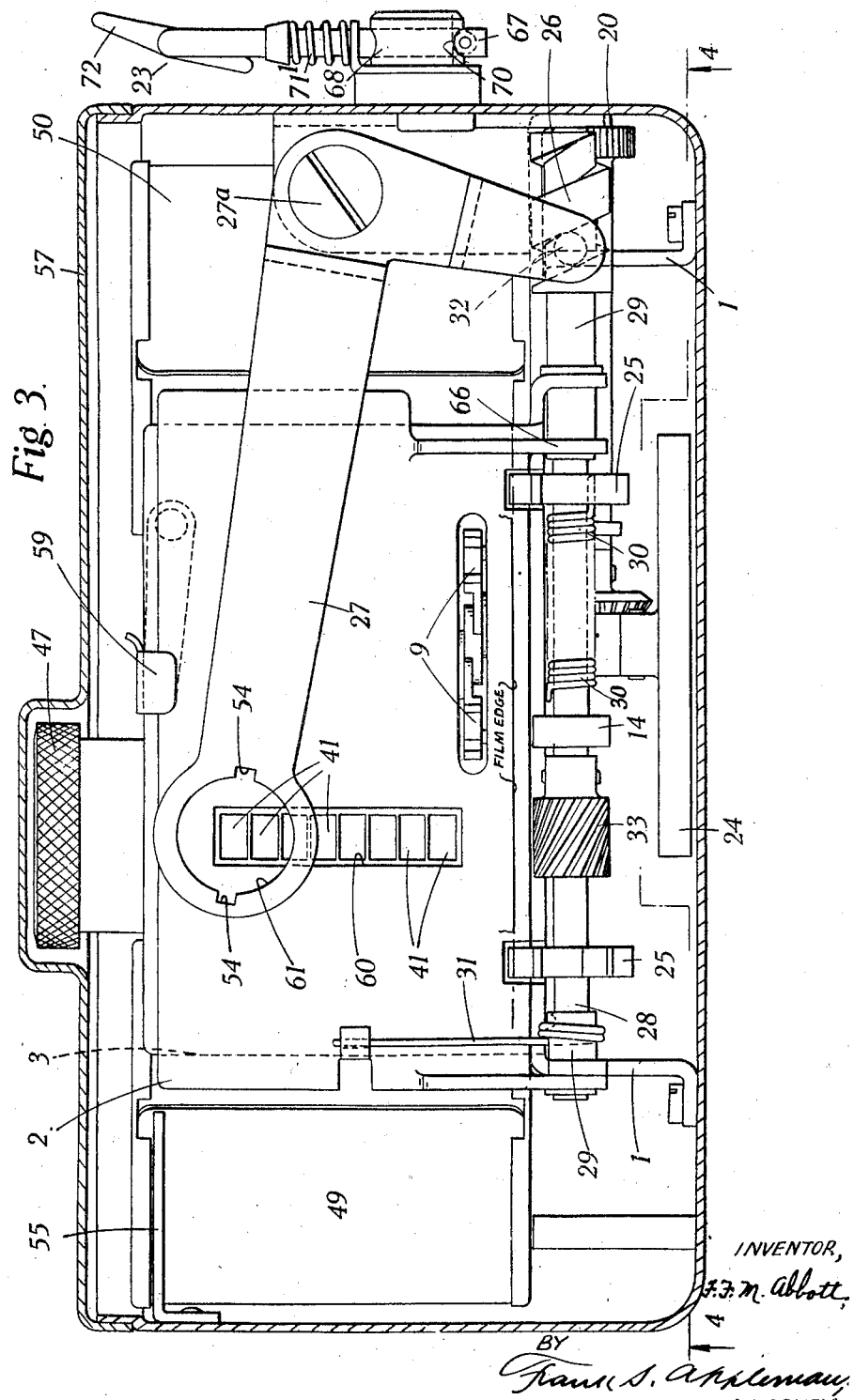
Fig. 3 is a sectional elevation on the line 3—3 of Fig. 4.

At the beginning of the feeding of the film, the bell crank 27 is in the position indicated in Fig. 3 and the optical system 40 is positioned as in Fig. 2. That is to say, both the optical system and opening 61 in crank 27 are aligned with the top opening 41 (Fig. 3) in the plate 3. They maintain this position as the film is cranked to the left (Fig. 1) from the magazine 49 to that of 50 until the right hand end of the film clears the right hand member 25.

During this operation, only the upper one-eighth of the film strip has been exposed and the shutter 42 has been actuated once for each rotation of the shaft 5 (see Fig. 6). The left hand pawl 9 has also moved the strip one step at each rotation of the shaft 5 by virtue of the engagement of the crank pin 5ª with the left hand lever 6. Of course, the moving of the film and the actuation of the shutter are not simultaneous, the pawl 9 and the shutter 42 being synchronized so that the film is stationary at the moment the exposure takes place. Then, as aforesaid, a partial or one-eighth rotation of the shaft 28 takes place. Further rotation is prevented by a staggered lug 25ª of the left hand member 25 coming into engagement with the film.

This partial rotation of the shaft 28 moves the optical system 40 and the opening 61 in the bell crank 27 into alignment with the second aperture 41 (from the top) of the plate 3.

During the partial rotation of the shaft 28 the cam 14 is moved through 45° to depress the raised arm of the two armed lever 12, to thereby disengage one pawl 9 and thus the right hand pawl 9 is brought into engagement with the film so that on the continued rotation of the handle 23 the film will now be moved in the opposite direction. This results in successive exposures of the second eighth of the film strip and when the other end of the film has passed the film reversal control 25 the shaft 28 is again rotated by its spring 30 through 45° whereupon the direction of movement of the film is again reversed. A further one-eighth rotation of the shaft 28 occurs, the optical system 40 and the aperture 61 in crank 27 are aligned with the third one-eighth of the film, and the movement of the film is again reversed.

With the arrangement as shown in the drawings the film is moved backwards and forwards four times in each direction until it is completely exposed, consequently there are eight lines of images produced on the film. The feed of the film for each exposure corresponds substantially to the width of each image so that thirty-two images are produced in the area of a normal film which is generally occupied by a single image.

It will be understood that by varying the ratio of the skew gears or the helical slot in the tubular member 35 and the helical groove in the boss 26 the number of rows of images can be varied whilst the feed of the film through the apparatus may be varied by varying the construction of the pawls and the mechanism by which they are operated.

The apparatus is suitable for a day-light loader without a bobbin so that no take up spindles, and consequently the necessary mechanism for operating the same, need not be provided in either of the compartments 49 and 50. For this purpose the day-light loader is provided at a suitable position on its inner side with a flexible jointed member which constrains the film to a smaller diameter than the inside of the loader thus dispensing with the usual take up and the necessary mechanism for operating the same.

Whilst it is preferred to have only a single pair of claws to co-operate with the perforations along one edge of the film it will be understood that two sets of claws may be provided so as to co-operate with the perforations at both edges of the film.

It will be understood that although the invention as above described refers to the use of a handle for driving the mechanism a suitable motor may be used for this purpose.

I claim:

1. In apparatus for the purpose specified the combination including a casing, a shutter, means for actuating said shutter, means for moving a film through said casing behind said shutter, and an optical system for focusing successive images upon successive portions of said film, a rotatably mounted shaft in said casing, a spring operatively engaging said shaft, said spring normally tending to rotate said shaft in one direction, a pair of stop members keyed in spaced relation on said shaft and relatively displaced to one another by an angle of 45°, said members being adapted to alternately engage with said film, the member in engagement with said film being disengageable therefrom to permit partial rotation of the shaft under the action of the spring after the film has completed a predetermined extent of its movement in one direction, further rotation of said shaft being prevented by the engagement of the film by the other member to permit a partial rotation of the shaft in the same direction as before when the film has completed a predetermined length of its movement in the opposite direction, a skew gear carried by said shaft, an optical system, a skew gear on said optical system, said skew gear engaging with the first mentioned skew gear and serving to produce movement of said optical system during each partial rotation of said shaft, film feeding mechanism including a pair of feed pawls, one of said feed pawls engaging the film for movement in one direction, the other pawl engaging said film for movement thereof in the opposite direction, and a cam keyed to said shaft, said cam co-operating with said film feeding mechanism so as to bring said pawls alternately into operative relation with said film.

2. In apparatus for the purpose specified the combination including a casing, a shutter, means for actuating said shutter, means for moving a film through said casing behind said shutter, and an optical system for focusing successive images upon successive portions of said film, a rotatably mounted shaft in said casing, a spring operatively engaging said shaft, said spring normally tending to rotate said shaft in one direction, a pair of stop members keyed in spaced relation on said shaft and relatively displaced to one another by an angle of 45°, said members being adapted to alternately engage with said film, the member in engagement with said film being disengageable therefrom to permit partial rotation of the shaft under the action of the spring after the film has completed a predetermined extent of its movement in one direction, further rotation of said shaft being prevented by the engagement of the film by the other member to permit a partial rotation of the shaft in the same direction as before when the film has completed a predetermined length of its movement in the opposite direction, a skew gear carried by said shaft, an optical system, a skew gear on said optical system, said skew gear engaging with the first mentioned skew gear and serving to produce movement of said optical system during each partial rotation of said shaft, film feeding mechanism including a pair of feed pawls, one of said feed pawls engaging the film for movement in one direction, the other pawl engaging said film for movement thereof in the opposite direction, and a cam keyed to said shaft, said cam co-operating with said film feed mechanism so as to bring said pawls alternately into operative relation with said film, a boss having a spiral groove therein, a pivotally mounted two-armed lever, a pin on one of said arms, said pin engaging said spiral groove, and a projecting lamp unit mounted in the other arm.

3. Apparatus according to claim 1 wherein said film feeding mechanism includes a pair of pivotally mounted levers, each of said levers having a slot therein, a crankshaft operatively engaging said slots, driving means for said crankshaft, one of said pawls being pivotally mounted on each of said levers, a spring actuated member co-operating with said pawls, said spring actuated member co-operating with said cam, the arrangement being such that on partial rotation of said cam one of said pawls is brought into operative relation with the film, whilst on further partial rotation of said cam the second pawl is brought into operative relation with said film.

4. Apparatus according to claim 1 wherein said film feeding mechanism includes a pair of pivotally mounted levers, each of said levers having a slot therein, a crank-shaft operatively engaging said slots, driving means for said crankshaft, one of said pawls being pivotally mounted on each of said levers, a spring actuated member co-operating with said pawls, said spring actuated member co-operating with said cam, the arrangement being such that on partial rotation of said cam one of said pawls is brought into operative relation with the film, whilst on further partial rotation of said cam the second pawl is brought into operative relation with said film, a pivotally mounted lever, said lever having an arcuate slot therein, said arcuate slot being engaged by said crank-shaft, and a sliding shutter pivotally connected to said lever.

5. In apparatus for the purpose specified, the combination including a casing, a shutter, means for actuating said shutter, means for moving a film through said casing behind said shutter, and an optical system for focusing successive images upon successive portions of said film, a spring actuated shaft in said casing, a pair of stop members mounted on said shaft, a plurality of projections on each of said members, the projections of one member being relatively displaced to the projections on the other member by a distance equal to half the spacing between said projections, said projections being adapted to alternately engage with said film, the member in engagement with said film being disengageable therefrom to permit partial rotation of the shaft when its projections are released by a film and allowing one of the projections of the other member to come into engagement with the film, the last mentioned projection when released by the film permitting further partial rotation of the shaft in the same direction as before whereupon another projection on the first member comes into engagement with the film, and an optical system operatively connected to said shaft, said optical system being moved in steps transversely across the film at each partial rotation of said shaft.

6. In apparatus for the purpose specified, the combination including a casing, a shutter, means for actuating said shutter, means for moving a film through said casing behind said shutter, and an optical system for focusing successive images upon successive portions of said films, a spring actuated rotary shaft in said casing, two stop members mounted in spaced relation on said shaft, four projections on each of said members, the projections of one of said members being displaced by 45° relatively to the projections on the other member, said projections being adapted to alternately engage with said film, and being alternately disengageable therefrom to allow a partial rotation of the shaft in the same direction when each of said projections are released by the film as it approaches the end of its travel in opposite directions, an optical system operatively associated with said shaft, said optical system being adapted to be moved through a predetermined distance transversely to the film at each partial rotation of said shaft, and a projecting lamp unit operatively associated with said shaft and moving in synchronism with said optical system.

7. A device of the class described including a casing, a shutter, means for actuating said shutter, means for moving a film through said casing behind said shutter, and an optical system for focusing successive images upon successive portions of said film; means for repeatedly reversing the direction of movement of said film as soon as substantially the entire length thereof has passed before the optical system in each direction, means for moving said optical system at each reversal of movement of said film to align said system with successive and adjacent strip-like portions of said film whereby to progressively expose said film in strip-like lengths thereof, said optical system includes a stationary casing, said casing having longitudinal slots therein, a tubular member rotatably mounted in said casing, said tubular member having diametrically oppositely disposed complementary spiral slots therein, a second tubular member located within the first tubular member, said second tubular member having diametrically opposite longitudinal slots therein, an objective mounting engaging said slots, an objective in said mounting, and means for rotating said first named tubular member to cause said spiral slots to engage said objective mounting to move the same along the longitudinal slots in the casing and said second tubular member.

8. A device of the class described including a casing, a shutter, means for actuating said shutter, means for moving a film through said casing behind said shutter, and an optical system for focusing successive images upon successive portions of said film; means for repeatedly reversing the direction of movement of said film as soon as substantially the entire length thereof has passed before the optical system in each direction, and means for moving said optical system at each reversal of movement of said film to align said system with successive and adjacent strip-like portions of said film whereby to progressively expose said film in strip-like lengths thereof, said last named means including a shaft, a boss mounted on said shaft, a helical groove in said boss, a double armed lever pivotally mounted in said casing, a pin on one arm of said lever, said pin engaging in said helical groove, the other arm of said lever being formed to provide means for mounting a projecting lamp unit thereon in alignment with said optical system, and said groove and pin operating to move said lever simultaneously with said optical system to maintain said optical system and lamp unit in alignment.

9. A device of the class described including a casing, a shutter, means for actuating said shutter, means for moving a film through said casing behind said shutter, and an optical system for focusing successive images upon successive portions of said film; means for continuously reversing the direction of movement of said film as soon as substantially the entire length thereof has passed before the optical system in each direction, said last named means including a shaft, means normally tending to rotate said shaft in one direction, spaced stop members on said shaft, said stop members being relatively displaced, one of said members engaging said film to prevent rotation of said shaft, said member being disengaged from said film by the passage of the film end thereby, said disengagement of said member permitting a partial rotation of said shaft to bring said other member into engagement with said film to stop rotation of said shaft, said second stop member being disengaged from said film to permit a further partial rotation of said shaft by the passage of the other end of said film thereby in the reverse direction, and an operative connection between said shaft and said optical system whereby the latter is moved into alignment with an adjacent strip-like length of said film at each partial rotation of said shaft.

10. The structure of claim 9, said operative connection between said shaft and said optical system comprising a skew gear keyed to said shaft, a second skew gear in engagement with said first gear, said optical system being operatively connected to said second gear, and means whereby rotation of said second gear moves said optical system through a plane parallel to the axis of said second gear.

11. The structure of claim 9, said operative connection between said shaft and said optical system comprising a skew gear keyed to said shaft, a second skew gear in engagement with said first gear, said optical system including an objective, a mounting for said objective, a stationary tube formed to provide diametrically opposed longitudinal slots therein, a second tube formed to provide diametrically opposed spiral slots therein, said second tube being secured to said second gear and rotatable therewith, said tubes being arranged one within the other, said mounting slidably engaging the slots of said tubes whereby rotation of said second tube causes the spiral slots thereof to move said mounting along the longitudinal slots of said first tube.

12. A device of the class described including a casing, a shutter, means for actuating said shutter, means for moving a film through said casing behind said shutter, and an optical system for focusing successive images upon successive portions of said film; means for repeatedly reversing the direction of movement of said film as soon as substantially the entire length thereof has passed before the optical system in each direction, means for moving said optical system at each reversal of movement of said film to align said system with successive and adjacent strip-like portions of said film whereby to progressively expose said film in strip-like lengths thereof, said means for moving said film through said casing including a rotatable shaft, means for rotating said shaft, said film being formed to provide a series of perforations along at least one edge thereof, a pawl engageable in said perforations and operatively connected to said shaft to intermittently advance said film in one direction as said shaft is rotated, a second pawl engageable in said perforations and operatively connected to said shaft to intermittently advance said film in the opposite direction as said shaft is rotated in the same direction, means normally maintaining one of said pawls in engagement with said perforations while maintaining said other pawl out of engagement with the same, and said means for reversing the direction of movement of said film comprising means for moving said first pawl out of engagement with said perforations while simultaneously moving said second pawl into engagement with the same.

FREDERICK FANT MICHAEL ABBOTT.